F. S. LEE.
CRANK SHAFT FOR INTERNAL COMBUSTION ENGINES.
APPLICATION FILED MAR. 24, 1920.
1,349,893.
Patented Aug. 17, 1920.
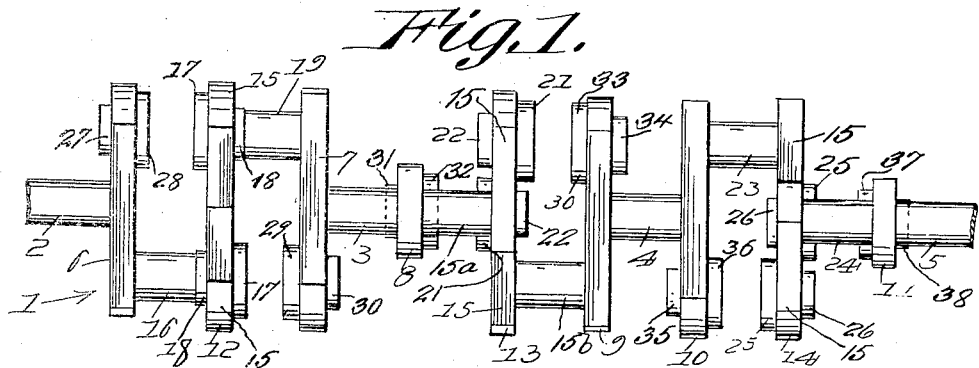
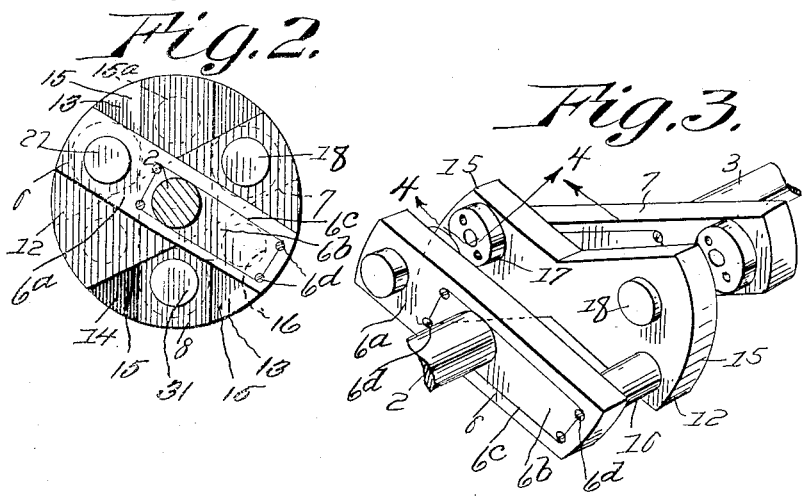
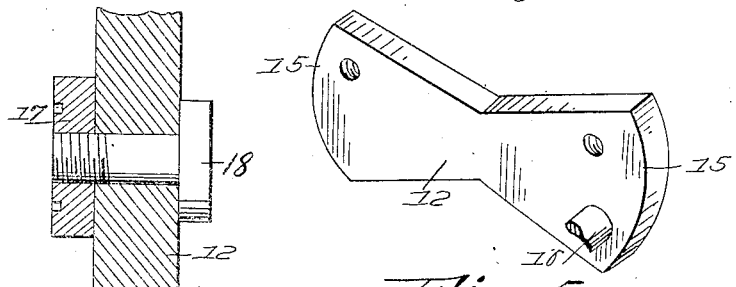
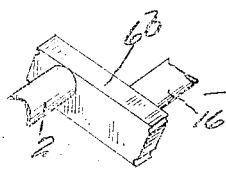
Inventor
Fred S. Lee,
By Watson E. Coleman.
Attorney

UNITED STATES PATENT OFFICE.

FRED S. LEE, OF VANLUE, OHIO.

CRANK-SHAFT FOR INTERNAL-COMBUSTION ENGINES.

1,349,893.  Specification of Letters Patent.  Patented Aug. 17, 1920.

Application filed March 24, 1920. Serial No. 368,338.

*To all whom it may concern:*

Be it known that I, FRED S. LEE, a citizen of the United States, residing at Vanlue, in the county of Hancock and State of Ohio, have invented certain new and useful Improvements in Crank-Shafts for Internal-Combustion Engines, of which the following is a specification, reference being had to the accompanying drawings.

This invention relates to an improved crank shaft for internal combustion engines, and particularly to the type employing a plurality of crank arms for use in connection with a series of cylinders. It is obvious that the number of cranks may be increased or decreased, as the case may require without deviating from the essential features and advantages of the invention and not deviating from the protection granted.

The invention aims to provide a crank shaft having centrifugally and equally balanced crank arms, thereby facilitating the operation of the pistons of the cylinders. A crank shaft of this kind will enable the pistons of the cylinders to operate more uniformly and in unison. Also it will reduce the wear and tear upon the various operating parts of the engine causing the pistons to operate more smoothly, more accurately and without interruption or pausing. Furthermore, the usual dead centering of the pistons with relation to the cranks of the shaft is materially overcome.

The invention further embodies a shaft, all parts of which can be readily machined, possibly with the exception of the balancing elements, which are first machined and are then applied to the arms.

The invention further resides in the idea of perfectly balancing the crank arms of the shaft, and through the centrifugal force of such balancing elements, the momentum of the shaft may be increased.

The invention contemplates the idea of machining all the surfaces of the arms, namely the parts between the connecting rod journals as well as machining the connecting rod journals, and by means of the balancing elements, the connecting rod journals are centrifugally balanced.

The invention still further aims to use the same amount of metal in the balancing elements as is in the connecting rod journals, and to position, the balancing elements and the connecting rod journals the same distance from the center of the crank shaft journals so as to insure balancing the crank arms.

The invention additionally aims to fasten the balancing elements by permitting one of each set of balancing elements to act as a nut for the shank of an opposing balancing element, so as to fasten the elements in place.

The invention also aims to provide segmental crank arms which really act as two arms in one, and two of its edges are parallel to the edges of an adjoining or intermediate arm, which also has opposite parallel edges, and two of its other edges are parallel with the parallel edges of another adjoining arm, thereby further insuring centrifugal balancing of the crank shaft parts.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:

Figure 1 is a view in side elevation of the improved crank shaft constructed in accordance with the invention, and in this disclosure the crank shaft is forged as in one instance as specified.

Fig. 2 is an end view of a crank shaft, showing certain of the crank arms built up, namely comprising two sections.

Fig. 3 is a section of crank shaft also showing the end crank arms 6 and 7 built up.

Fig. 4 is a sectional view on line 4—4 of Fig. 3.

Fig. 5 is a detail view of one of the segmental crank arms, and

Fig. 6 is a detail perspective view of the inset section of one of the crank arms 6—11 inclusive.

Referring more especially to the drawings, 1 designates the crank shaft as a whole, and which comprises the crank shaft journals 2, 3, 4 and 5. The crank shaft journal 2 has a crank arm 6 connected to it, whereas the crank shaft journal 3 is provided on its opposite end with crank arms 7 and 8. The crank shaft journal 4 also has on its opposite ends crank arms 9 and 10. The crank shaft journal 5 has mounted on one of its ends a crank arm 11. These crank arms 6, 7, 8, 9, 10 and 11 extend at right angles to the crank shaft journals and have parallel longitudinal edges, which are designed to be machined as well as the face of the crank arms. The end edges of these arms are also designed to be machined.

Furthermore, these crank arms 6, 7, 8, 9, 10 and 11 are at different angles to the crank shaft journals. None of them are positioned at the same angles adjacent to each other. However, the arm 6 extends at the same angle with the arm 9, the arm 7 at the same angle with the arm 10 and the arm 8 at the same angle with the arm 11. Arranged intermediate the crank arms 6 and 7 and between the arms 8 and 9 and between the arms 10 and 11 are additional crank arms 12, 13 and 14. These arms are differently formed, and have segmental opposite parts 15. One end of the crank arm 6 has a connecting rod journal 16 connected to one of the segments of the crank arm 12, the segment to which it is connected being provided with counter-balancing elements 17 and 18. The other segmental portion of the crank arm 12 has a connecting rod journal 19, which is connected to one of the ends of the crank arm 7. The corresponding portions of the segmental parts of the crank arm 13 have connecting rod journals 15ª and 15ᵇ, which are in turn connected to the crank arms 8 and 9.

The other portion of the segmental parts of the crank arm 13 are counter-balanced by the elements 21 and 22. It will be noted that the elements 21 are larger than the elements 22, and the elements 21 are disposed upon diametrically opposite portions of the opposite faces of the crank arm 13, while the balancing elements 22 are connected to the opposite faces concentrically therewith. This same arrangement of counter-balancing elements carried by the crank arm 12 is employed. The crank arm 14 also carries connecting rod journals 23 and 24, which are connected to the corresponding parts of the segmental portion of the crank arm 14, and one of these connecting rod journals is concentric with the connecting rod journal 19, while the other is concentric with the connecting rod journal 15ª of the crank arm 13, whereas the connecting rod journal 16 of the crank arm 12 is concentric with the connecting rod journal 15ᵇ of the crank arm 13. It is obvious that in this way that the crank shaft is centrifugally well balanced so as to facilitate the revoluble momentum of the crank shaft during its operation and to enable the pistons to smoothly and very easily operate, uniformly and without any interruptions or pauses. The connecting rod journals 23 and 24 are connected to the segmental parts of the crank arm 14 in positions opposite to the connecting rod journals 15ª and 15ᵇ of the segmental parts of the crank arm 13 to thereby centrifugally balance these parts during their revoluble movements. The connecting rod journals 19 and 23 are axially alined, while the connecting rod journals 15ᵇ and 16 are axially alined, whereas the connecting rod journals 15ª and 24 are axially alined. The connecting rod journals 23 and 24 are counter-balanced by the counter-balancing elements 25 and 26. These elements 25 and 26 are similar to the counter-balancing elements 21 and 22 and are arranged correspondingly. Certain of the counter-balancing elements 25 and 26 of the crank arm 14 are axially alined with the counter-balancing elements 21 and 22 of the crank arm 13. The free ends of the crank arms 6, 7, 8, 9, 10 and 11 have secured thereto counter-balancing elements 27 and 28, 29 and 30, 31 and 32, 33 and 34, 35 and 36, and 37 and 38. These elements act to counter-balance the connecting rod journals 16, 19, 23 and 24 and the connecting rod journals of the crank arms 8 and 9, so that together with the other counter-balancing elements, a smoother and uniform operation of the shaft is assured. Each pair of counter-balancing elements for the crank arms is separably fastened to the respective crank arms. This is accomplished by one of the counter-balancing elements acting as a nut connected to the shank of the other counter-balancing element as shown in the sectional view of the drawings. It is to be noted that every part of this shank can be machined, the faces, the radial edges and the end curved edges, as well as the connecting rod journals and the crank shaft journals.

In constructing this form of crank shaft, it is obvious that all the parts thereof may be forged integrally, excepting the balancing elements such as the disks, as shown in Fig. 1, or the shaft may be built up as for instance as shown in Figs. 2, 3 and 6. However, in either case, if the shaft is completed it will appear the same as it does in Fig. 1. The side faces of the crank arm are designed to be faced up when turning the crank and main journals. Also the ends of the arms are turned up and finished when turning up the main crank shaft journals, whereby the edges of the arms are finished up by means of a shaper or planer, making them the exact sizes from end to end. It will be noted that certain edges of the segmental crank arms are in parallelism with the opposite edges of the other crank arms and vice versa, that is to say, certain adjacent crank arms. In building up the crank shaft, it is the aim to forge the segmental crank arms, which have two pair of weights or counter-balancing elements, whereas the arms 6, 7, 8, 9, 10 and 11 may be built up, and their connecting rod journals in this case be connected to the segmental crank arms in any suitable manner (not shown). Also, if desired, the connecting rod journals of the arms 6—11 inclusive may be connected to the segmental crank arms during the operation of forging said segmental crank arms. In order to complete the crank arms 6—11 inclusive in the manner shown, that is to finish building them up, each of said arms 6—11 inclusive may consist of the parts 6ª and 6ᵇ. The part 6ª is in the form of a single body, which is slotted as shown at 6ᶜ for the reception of the part 6ᵇ, as shown clearly in Figs. 2 and 3 and as shown in Fig. 6. In Fig. 6 the part 6ᵇ is illustrated, disclosing the fact that said part and the crank shaft journal 2 and the connecting rod journal 16 are all forged in one piece, and the part 6ᵇ constitutes an inset to engage the slot or opening 6ᶜ. In order to hold the inset part 6ᵇ in the slot 6ᶜ of the part 6ª, threaded rivets 6ᵈ are employed, which engage the corners of the inset and the corners of the slot, thereby holding the inset securely in position. The advantage in building up the crank shaft in this manner is to simplify the forging process, however, building up the crank shaft, it would appear and be exactly as shown in Fig. 1. The building up of the crank shaft in this manner may be only carried out in regard to the end crank arms 6 and 11, if so desired.

It is to be noted that the segmental crank arms (such as shown in Fig. 5) may be used in connection with six cylinder engines, where three and four main axle journals are used. Also in a six cylinder shaft where seven main journals are used, the segmental crank arms (Fig. 5) may be eliminated, and crank arms such as the arms 6 in Fig. 1 used entirely and which crank arms may be forged integrally or built up as in Figs. 2 and 3. In either case, however, sufficient balancing elements are added to the arm.

It is also to be noted that the bearing elements are designed to be large and heavy enough not only to balance connecting rod journals, but also parts of the connecting rods which are attached to the journals.

The invention having been set forth, what is claimed as new and useful is:—

1. A crank shaft comprising crank shaft journals, crank arms connected to the adjacent ends of said journals and arranged at angles to each other radially from the journals, an intermediate crank arm having segmental parts, the edges of which correspond to the angles of the first crank arms, each of said remote longitudinal edges of the first crank arms consisting of two sections, one consisting of an inset section, the other a crank arm completing section having a slot to receive the inset section, the inset section carrying one of said crank shaft journals at one end, a connecting rod journal at the other end of said inset section and being connected to an opposite segmental part of the intermediate crank arm, and means to secure the inset section in the crank arm completing section.

2. A crank shaft comprising crank shaft journals, crank arms connected to the adjacent ends of said journals and arranged at angles to each other radially from the journals, an intermediate crank arm having segmental parts, the edges of which correspond to the angles of the remote longitudinal edges of the first crank arms, each of said first crank arms consisting of two sections, one consisting of an inset section, the other a crank arm completing section having a slot to receive the inset section, the inset section carrying one of said crank shaft journals at one end, a connecting rod journal at the other end of said inset section and being connected to an opposite segmental part of the intermediate crank arm, and means to secure the inset section in the crank arm completing section, and counter-balancing elements carried by the ends of the first crank arms at their ends opposite the connecting rod journals.

3. A crank shaft comprising crank shaft journals, crank arms connected to the adjacent ends of said journals and arranged at angles to each other radially from the journals, an intermediate crank arm having segmental parts, the edges of which correspond to the angles of the remote longitudinal edges of the first crank arms, each of said first crank arms consisting of two sections, one consisting of an inset section, the other a crank arm completing section having a slot to receive the inset section, the inset section carrying one of said crank shaft journals at one end, a connecting rod journal at the other end of said inset section and being connected to an opposite segmental part of the intermediate crank arm, and means to secure the inset section in the crank arm completing section, and counter-balancing elements carried by the ends of the first crank arms at their ends opposite the connecting rod journals, and counter-balancing elements carried by the segmental parts of the intermediate crank arms adjacent the connecting rod journals which are connected to the segmental parts.

4. As an article of manufacture, a crank shaft comprising axially alined crank shaft journals, a pair of crank arms connected to the adjacent ends of said journals and being disposed in intersecting planes, certain diagonal opposite ends of said crank arms having counterbalancing members to create counterbalancing centrifugal pulls on the journals, an intermediate crank arm having segmental parts, the opposite edges of each of which converge toward a point in a plane including the periphery of the journals, said converging edges of the segmental parts conforming to the angles assumed by the edges of the crank arms which are connected directly to the journals, connecting rod journals connecting the other diagonally opposite ends of the crank arms which are carried by the shaft journal and diametrically opposite portions of said segmental parts, and means carried by the segmental parts and offset to one side of the connecting rod journals for coöperating with the first counterbalancing means to insure the creating of counterbalancing centrifugal pulls upon the shaft.

In testimony whereof I hereunto affix my signature.

FRED S. LEE.